(12) United States Patent
Hardman (10) Patent No.: US 7,389,410 B1
(45) Date of Patent: Jun. 17, 2008

(54) AUTOMATICALLY DERIVING ORDER OF INITIALIZATION FOR COMPUTING SERVICES ACROSS MULTIPLE COMPUTING SYSTEMS

(75) Inventor: Daniel H. Hardman, American Fork, UT (US)

(73) Assignee: Symantec Corporation, Cupertino, CA (US)

( * ) Notice: Subject to any disclaimer, the term of this patent is extended or adjusted under 35 U.S.C. 154(b) by 498 days.

(21) Appl. No.: 11/180,800

(22) Filed: Jul. 13, 2005

(51) Int. Cl.
*G06F 9/00* (2006.01)
(52) U.S. Cl. .............................. 713/1; 706/55; 712/216; 713/2; 718/106
(58) Field of Classification Search .............. 713/1, 713/2; 706/55; 712/216; 718/106
See application file for complete search history.

(56) References Cited

U.S. PATENT DOCUMENTS

| | | | |
|---|---|---|---|
| 5,555,411 A * | 9/1996 | England et al. ............. 717/162 |
| 6,195,723 B1 * | 2/2001 | Neal et al. ................... 710/313 |
| 6,421,827 B1 * | 7/2002 | Dimpsey et al. ............ 717/178 |
| 6,438,618 B1 * | 8/2002 | Lortz et al. .................. 719/318 |
| 6,754,703 B1 * | 6/2004 | Spring ......................... 709/223 |
| 6,996,802 B2 * | 2/2006 | de Jong ....................... 717/107 |
| 7,171,549 B2 * | 1/2007 | Machida et al. ................ 713/1 |
| 7,302,614 B2 * | 11/2007 | Goto ........................... 714/43 |
| 2002/0147903 A1 * | 10/2002 | Hubert et al. .................. 713/1 |
| 2004/0153809 A1 * | 8/2004 | Goto ........................... 714/36 |
| 2005/0278688 A1 * | 12/2005 | Buskens et al. ............. 717/103 |
| 2006/0135138 A1 * | 6/2006 | Lazaridis .................... 455/417 |

\* cited by examiner

*Primary Examiner*—Abdelmoniem Elamin
(74) *Attorney, Agent, or Firm*—Holland & Hart (57) ABSTRACT

Automated derivation of an initialization ordering for computing services distributed across multiple computing systems. The initialization ordering is derived by monitoring initialization times for the computing services for one or more prior initializations of the computing services. Initialization dependencies of the computing services are then estimated based on the time of their initialization. The entire initialization ordering is then derived based on the estimated initialization dependencies.

20 Claims, 4 Drawing Sheets

AUTOMATICALLY DERIVING ORDER OF INITIALIZATION FOR COMPUTING SERVICES ACROSS MULTIPLE COMPUTING SYSTEMS

BACKGROUND OF THE INVENTION

Computing technology has revolutionized the way that we work, play, and communicate. Computing technology has been integrated into a wide variety of devices; sometimes such systems are networked together to form an intricate fabric of processing centers. It is not unusual for even a small organization to have a number of computing systems interconnected to accomplish the overall computing needs of the organization. For instance, firewalls, Domain Name Servers (also referred to as "DNS" servers), e-mail servers, web servers, domain controllers, database servers, and so forth, may each provide valuable services for an organization.

Complex networks may be quite complicated to manage. For instance, each computing system may operate a number of services or daemons. Each of these services may depend on the other services within the computing system, or perhaps depend on services operating on even other computing systems. It is often difficult for even the most experienced of Information Technology (IT) professionals to have a perfect concept of the interdependencies of the variety of services. This can be especially true for large corporate networks in which there can be literally hundreds of interoperating servers.

BRIEF SUMMARY OF THE INVENTION

The foregoing problems with the prior state of the art are overcome by the principles of the present invention, which are directed towards the automated derivation of an initialization ordering for computing services distributed across multiple computing systems. The initialization ordering is derived by monitoring initialization timestamps for the computing services for one or more prior initializations of the computing services. Initialization dependencies of the computing services are estimated, and the initialization ordering constraints that flow from these estimations, are then derived based on the relative timing of their initializations.

Additional embodiments the invention will be set forth in the description that follows, and in part will be obvious from the description, or may be learned by the practice of the invention. The embodiments of the invention may be realized and obtained by means of the instruments and combinations particularly pointed out in the appended claims. These and other embodiments of the present invention will become more fully apparent from the following description and appended claims, or may be learned by the practice of the invention as set forth hereinafter.

BRIEF DESCRIPTION OF THE SEVERAL VIEWS OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to the automated derivation of an initialization ordering for computing services distributed across multiple computing systems. The initialization ordering is derived by monitoring initialization timestamps for the computing services for one or more prior initializations of the computing services. Initialization dependencies of the computing services are estimated. The initialization ordering constraints that flow from these estimations, are then derived based on the relative timing of their initializations.

First, a general computing system will be described with respect to FIG. 1, as being a suitable computing system that may be used to practice the principles of the present invention. Then, the principles of the present invention will be described with respect to FIGS. 2 through 6.

Figure 1:
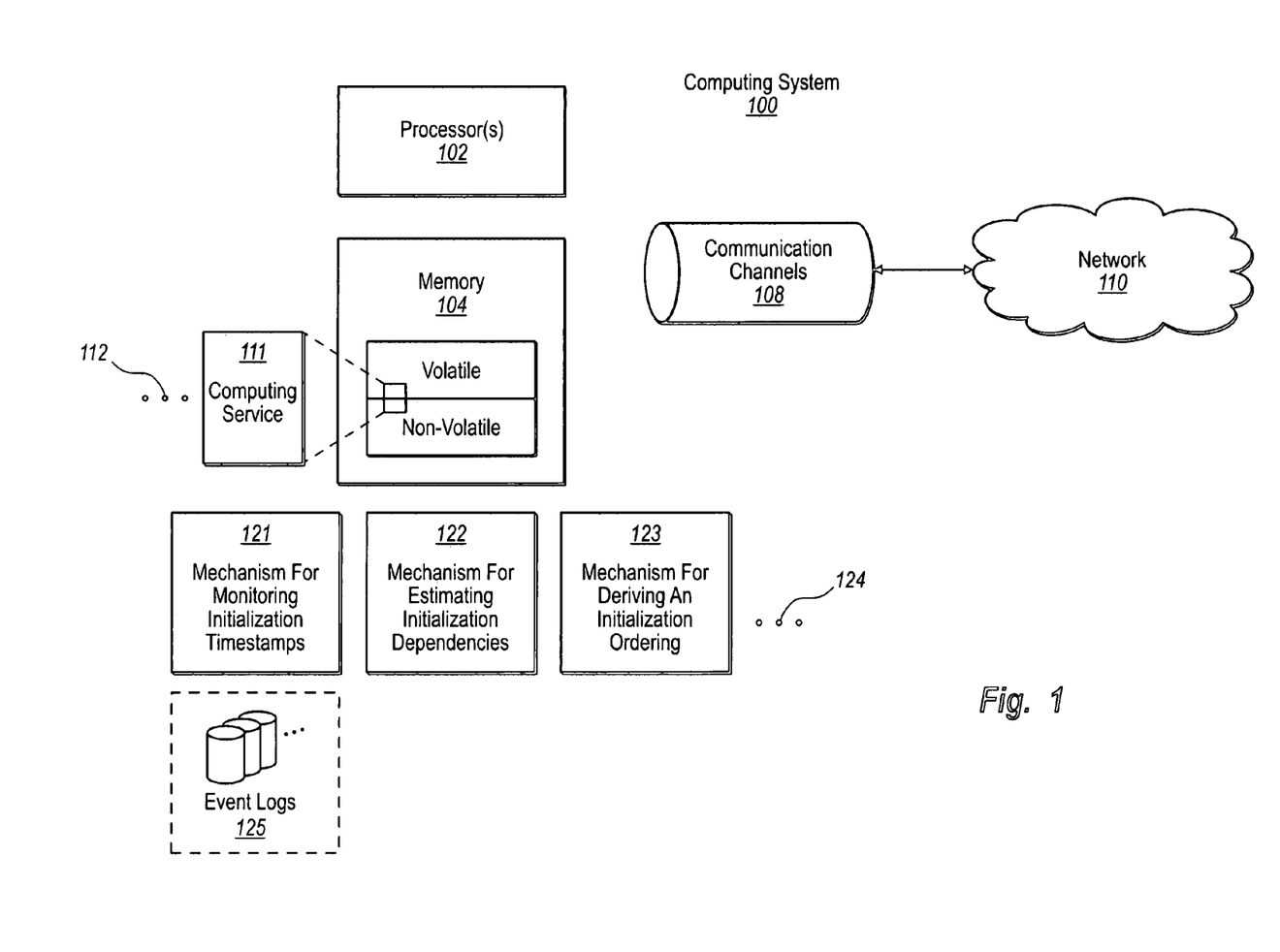
FIG. 1 illustrates a computing system that may be used to implement features of the present invention.

FIG. 1 shows a schematic diagram of an example computing system 100 that may be used to implement features of the present invention. The described computing system is only one example of such a suitable computing system and is not intended to suggest any limitation as to the scope of use or functionality of the invention. Neither should the invention be interpreted as having any dependency or requirement relating to any one or combination of components illustrated in FIG. 1.

Computing systems are now increasingly taking a wide variety of forms. Computing systems may, for example, be handheld devices, appliances, laptop computers, desktop computers, mainframes, or distributed computing systems. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Referring to FIG. 1, in its most basic configuration, a computing system 100 typically includes at least one processing unit 102 and memory 104. The memory 104 may be volatile, non-volatile, or some combination of the two. An example of volatile memory includes Random Access Memory (RAM). Examples of non-volatile memory include Read Only Memory (ROM), flash memory, or the like. The term "memory" may also be used herein to refer to non-volatile mass storage. Such storage may be removable or non-removable, and may include (but is not limited to) PCM-CIA cards, magnetic and optical disks, magnetic tape, and the like.

As used herein, the term "module" or "component" can refer to software objects or routines that execute on the computing system. The different components, modules, engines, and services described herein may be implemented as objects or processes that execute on the computing system (e.g., as separate threads). While the system and methods described herein may be implemented in software, implementations in hardware, and in combinations of software and hardware are also possible and contemplated.

In the description that follows, embodiments of the invention are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other computing systems over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media. The remaining components of FIG. 1 will be described in the subsequent description.

The principles of the present invention allow for dependencies and ordering between computing services and for the initialization ordering constraints that derive therefrom, to be automatically derived, even for complex systems. For instance, a computing service may rely on services provided by one or more other computing services in order to operate optimally. Likewise, a computing service may be relied upon by one or more other computing services to operate optimally. Computing services may both provide services to other computing services, and be relied upon by other computing services.

The principles of the present invention also permit the dependency and ordering constraints to be reevaluated as appropriate. For instance, the automated evaluation of dependency and ordering may be performed continuously, periodically, and/or in response to one or more events. Accordingly, an accurate knowledge of the dependency and ordering between computing services may be maintained in real time, even as the precise configuration of the multiple independent computing systems and services evolves over time.

While the principles of the present invention may operate to derive an initialization ordering for an interconnected fabric of computing services, they may also be used to derive an initialization ordering for arbitrary points of time in the past, or in the future. The derivation of initialization ordering for arbitrary points in the past might be especially useful if parts or all of the system is rolled back to a prior point in time due to, for example, recovery from backup. The derivation of initialization ordering for arbitrary points in the future might be especially useful as verification that an initialization ordering would work for some point in the future, or to identify alternative initialization ordering that could be applied in the future.

Furthermore, since the derivation of the initialization ordering is automated, action to be taken based on that derivation may be automated as well. For instance, re-initialization of the computing services may be automatically performed in the derived initialization ordering. Alternatively or in addition, the computing systems that provide the computing services may be rebooted in proper order.

The principles of the present invention are not limited to any particular number of computing systems, and any particular dependency between the computing services, nor are the present invention limited to any particular number of computing systems that operate those computing services. Nevertheless, to provide clarity to the broader principles of the present invention, a specific example of a system 200 of computing services is given with respect to FIG. 2.

Figure 2:
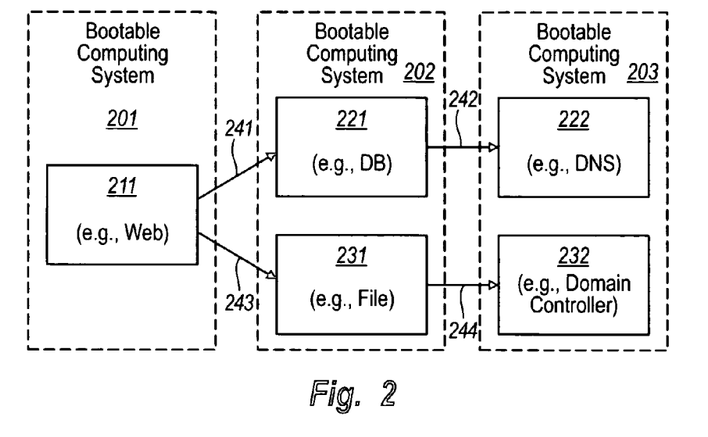
FIG. 2 illustrates an example system that includes multiple interdependent computing services distributed across multiple computing systems.

The system 200 includes a number of computing systems, each running one or more computing services thereon. In this example, computing system 201 operates computing service 211, computing system 202 operates computing services 221 and 231, and computing system 203 operates computing services 222 and 232. The computing services 211, 221, 222, 231 and 232 are shown to illustrate an example of computing services that have dependencies as represented by arrows 241 through 244. The direction of the arrows corresponds to the direction of dependency; service 211 is dependent on service 221, for example. FIG. 1 illustrates a possible scenario in which the computing system 100 is acting as one of the computing systems. In that case, computing service 111 (amongst potentially others as represented by the ellipses 112) may be operated by the computing system. In particular, the computing service 111 may be present in volatile and/or non-volatile memory and may be rendered functional by computer-executable instructions executable by the processor(s) 102.

Although not illustrated, the computing systems may operate other services as well. However, those services may be less relevant for the principles of the present invention if they do not have dependencies with the illustrated computing services, or if the dependencies with the illustrated computing services are not a dependency of interest. For example, perhaps a dependency only affects a very low level function that is rarely used.

While FIG. 2 illustrates three computing systems, the principles of the present invention may be applied any number of computing systems. The computing systems may be any computing system that includes one or more processors capable of executing computer executable instructions from memory. The computing services may be provided by software, hardware, or a combination of software and hardware. As an example, the computing services may be one or more software applications and/or one or more other components or modules.

To illustrate the kind of dependencies that may occur in a real life situation, an example of the computing service 211 is illustrated as being a Web service, an example of the computing service 221 is a database (DB) server, an example of the computing service 222 is a Domain Name Server (DNS) server, an example of the computing service 231 is a file server, and an example of the computing service 232 is a domain controller.

In this example, the Web server typically relies on the database server (as represented by dependency arrow 241) to populate Web pages with dynamic data. While the Web server may operate without the database server, its operation will not be optimal if it is unable to populate Web pages with dynamic data. The Web server may also rely on the file server (as represented by dependency arrow 243) for some of the resources (e.g., images, video, sounds, executable controls) that it exposes.

The Web server may authenticate to the file server using credentials which are validated by the domain controller. Thus, the file server cannot provide full services to the Web server until the domain controller is operational (as represented by dependency arrow 244).

The Web server finds the database server using data supplied by the DNS server. Thus, the database server cannot provide full services to the database server until the DNS server is operational (as represented by dependency arrow 242).

Once dependencies are known, that knowledge may be put to any use. One particularly useful application is to derive an initialization ordering. For example, although each of these computing services may be initialized independently, a fully functional environment depends on the computing services being initialized in the proper order. In the specific example, if the domain controller is not responding to domain authentication queries when the Web server initializes, the Web server will fail to access the file server. Likewise, if the DNS server is unavailable, the Web server will be unable to find the database server. Although connectivity logic often includes a certain amount of retry and error correction, it is quite possible that local caching of failed authentication and failed DNS lookup will force the server to be re-initialized once the DNS server and domain controller become available. It would be much better to initialize the DNS server and domain controller first, initialize the database server after the DNS server, initialize the file server after the domain controller, and initialize the Web server after the database and file servers.

The initialization ordering for this example system may be easy to manually determine for an experienced Information Technology (IT) professional. However, the example has been kept quite simple in order not to obscure the principles of the present invention. Real life systems often can involve hundreds or thousands of interdependent computing services distributed across many different physical machines. It would be a laborious or practically impossible task for even an experienced IT professional to manually identify all of the particular dependencies in such a complex network, and to update such a model accurately as the fabric evolves over time.

Figure 3:
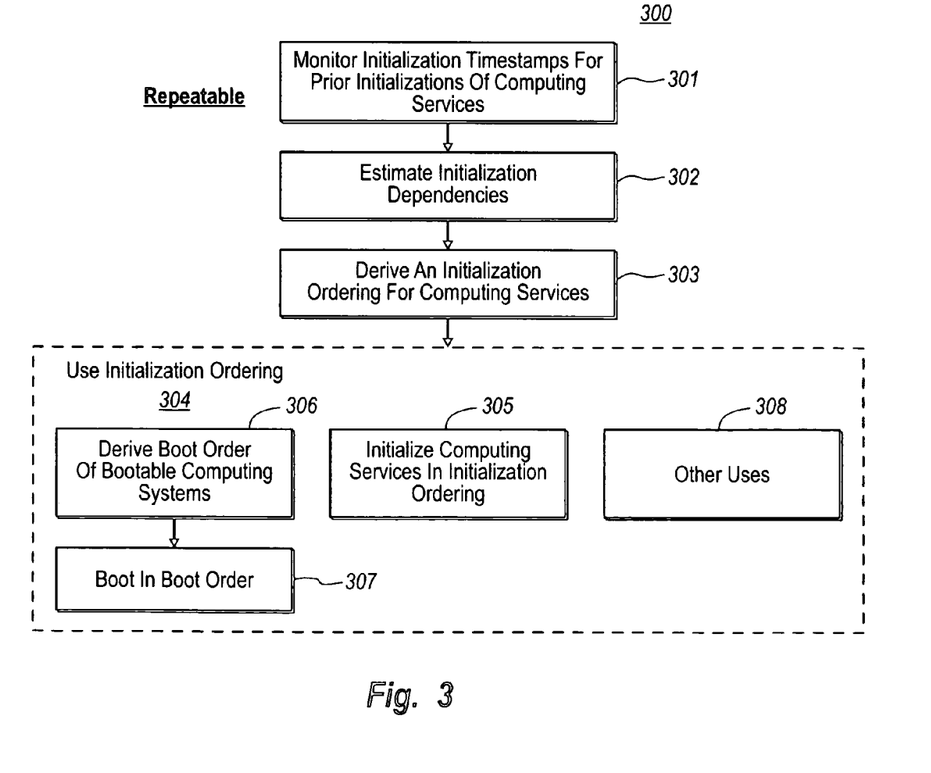
FIG. 3 illustrates a flowchart of a method for automatically deriving an initialization ordering among multiple computing services distributed across multiple computing systems.

FIG. 3 illustrates a flowchart of a method 300 for automatically deriving an initialization ordering for a number of computing services distributed over multiple computing systems. As the method 300 of FIG. 3 may be performed on the example system 200 of FIG. 2, the method 300 will be described with frequent reference to the example system 200. However, as will be apparent to one of ordinary skill in the art after having reviewed this description, the principles of the present invention may be applied to any system of interdependent computing services, regardless of the complexity of the interdependency.

The method 300 includes monitoring initialization timestamps for the computing services for one or more prior initializations of the computing services (act 301). If it is desired to determine a current initialization ordering, the most recent initializations may be monitored. If it is desired to determine an initialization ordering for a prior instant in time, initializations proximate to that prior instant in time may be evaluated. If it is desired to determine an initialization ordering for a future point in time, then the schedule for computing service initializations proximate that future point in time may be monitored.

Regardless of whether the time is the current time, some prior point in time, or some future point in time, the evaluations may give greater weight for initializations that are closer to the point of time of interest. For instance, initialization that occurred five minutes ago may be given greater weight than initializations ten hours ago, if a current initialization ordering is desired.

If the computing system 100 is performing the method 300, the mechanism 121 may perform this monitoring act. The mechanism 121 may be software, hardware, or a combination. Note that it is not necessary that a computing system that performs this method also be one of the computing systems that operates one or more of the computing services under evaluation.

Figure 4:
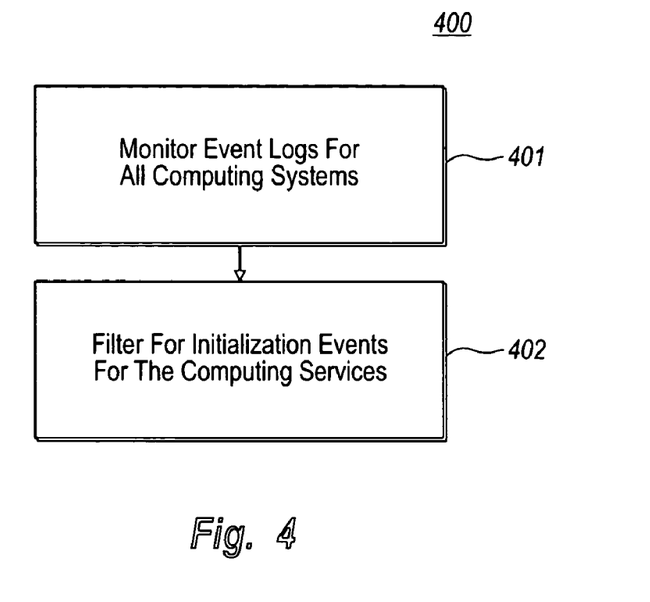
FIG. 4 illustrates a flowchart of a method for monitoring initialization times for prior initializations of computing services.

FIG. 4 is a flowchart of an example method 400 for monitoring initialization times and represents just one example of a suitable method for performing the monitoring act of act 301. For instance, the mechanism 121 may monitor one or more initialization event logs for each of the computing systems (act 401) that operates a computing service in the system. For instance, mechanism 121 may monitor event logs 125. For instance, the Microsoft WINDOWS® operating system contains event logs with readable entries. Linux and Unix and many mainframe operating systems have log files. The event logs may contain more than just service initialization information.

The mechanism 121 then filters the one or more initialization event logs for events related to initialization of the computing services under evaluation (act 402). This may be done by reading all entries in the log file that contain initialization timestamps for the computing services in the system under evaluation. Entries that do not relate to the initialization of the computing services may be ignored. For instance, an entry in a Microsoft WINDOWS® operating system event log that shows a firewall starting is not particularly relevant to a machine's role as a file or database server. However, entries that show low-level internal failures are useful to the extent that they may indicate high-level flawed initialization. Such internal failures may be used to devalue the weight given to that particular initialization attempt for the computing services.

As a side matter, since the mechanism 121 may evaluate initialization entries of multiple computing systems, the mechanism 121 may guarantee comparability of timestamps across these multiple computing systems. This can be done by performing conventional server time synchronization. Alternatively, the mechanism 121 may query each machine for their current time reckoning, and then calculate and apply compensation factors to account for time reckoning differences across the computing systems, and to thereby create synchronized equivalent time entries.

The following Table 1 represents example relevant time entries that may be acquired using the method 400 of FIG. 4 when applied to the example system 200 of FIG. 2.

TABLE 1

| Event Order | Initialization Time | Machine | Service |
| --- | --- | --- | --- |
| 1 | 12:03:21 am | 203 | Domain Controller |
| 2 | 12:05:19 am | 202 | File Server |
| 3 | 04:27:01 am | 203 | DNS Server |
| 4 | 04:43:32 pm | 203 | DNS Server |
| 5 | 05:11:45 pm | 202 | Database Server |
| 6 | 05:47:59 pm | 201 | Web Server |

In actual implementation, this table may be considerably more complex. Events covering many days and hundreds of computing systems could appear. The same service may show up several times in the list, and multiple services could map to the same physical machine. However, Table 1 has the following characteristics:

1) It captures an absolute ordering of events;
2) The events are computing service initializations, and not machine boots;
3) The services are tied to the computing system that hosts the service; and
4) More than one service can be tied to the same computing system.

When evaluating the event logs, the technical names for the services may be quite different from the human-readable forms represented above. The mechanism 121 could have a mapping of the technical names for the service to the more human-readable form of the service name. Minor differences in service identification could also optionally be collapsed by such a mapping, if greater ability to generalize from the data is desired. This might be helpful if a service name is modified slightly as part of an upgrade, for example.

Returning to FIG. 3, initialization dependencies for pairs of the computing services in the system are then automatically estimated based on the initialization events (act 302). Referring to FIG. 1, if this is performed by the computing system 100, mechanism 122 may perform this determination. The mechanism 122 may be software, hardware, or a combination.

Figure 5:
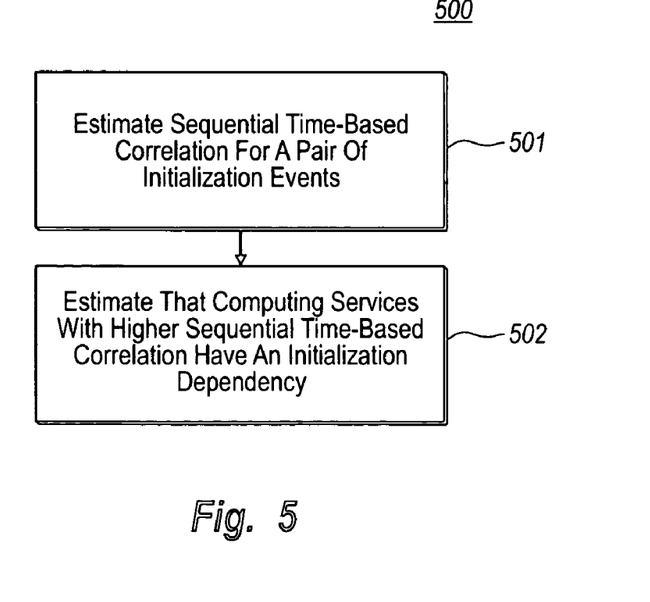
FIG. 5 illustrates a flowchart of a method for estimating an initialization dependency between a pair of computing services.

FIG. 5 illustrates a flowchart of a method 500 for estimating initialization dependencies and serves as an example of one of many methods that may be used to perform act 302. For multiple event pairs of the initializations of the computing services, the mechanism 122 may estimate a sequential time-based correlation for the initializations of the pair of computing services (act 501). In this description and in the claims, a sequential time-based correlation is a value that is a function of which initialization came first in the pair of computing services, as well as the time difference between the initializations.

For example, for each pair of initialization events, there might be two sequential time-based correlation values for computing services abstractly named A and B. The A after B value may be, for example, 0.8 on a scale of zero to one, indicating that the initialization of A often follows the initialization of B in a time frame that suggests A is dependent on B. The B after A value may be, for example, 0.1 on a scale of zero to one, indicating that the initialization of B does not often follow the initialization of B in a time frame that suggest B is dependent on A. Alternatively, as in Table 2 below, a negative or positive polarity may represent which initialization comes first.

The mechanism 122 may then estimate that the pairs of initialization events with higher sequential time-based correlation have an initialization dependency (act 502). For instance, in the above example, if the threshold value for determining dependency is 0.7, A is determined to depend on B, but B is not determined to depend on A. This threshold value may be adjusted as desired depending on the sample size for each sequential pair of computing services.

Figure 6:
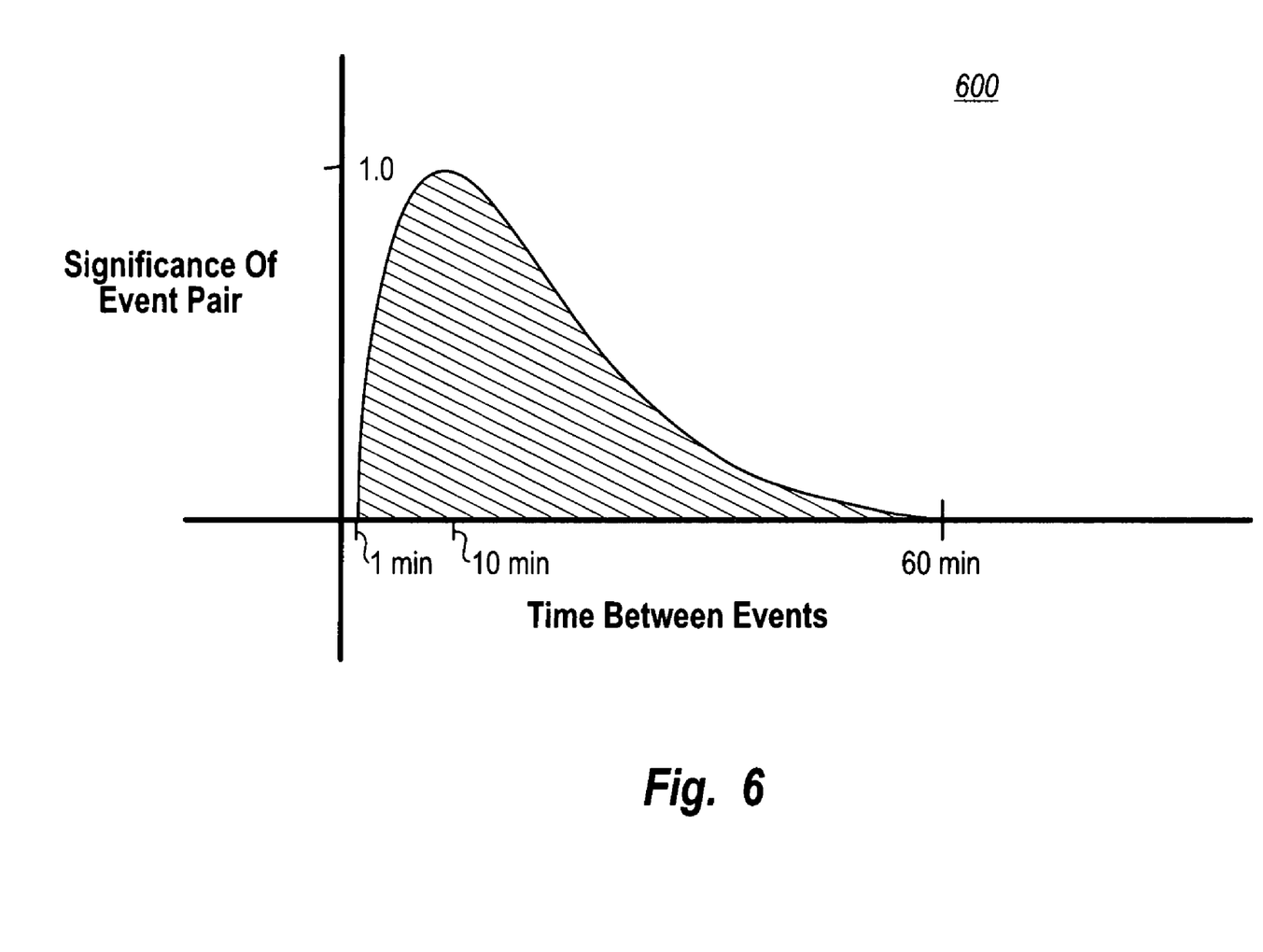
FIG. 6 illustrates a weighting function that may be used to estimate initialization dependencies.

In one embodiment, the sequential time-based correlation is weighted with a single-peak time dependency function so that the correlation tends to be lower if the period of time between initializations of the pair of computing services is within a time period that is less than a time period associated with a maximum suggested correlation, and also tends the correlation to be lower if the period of time between the initializations of the pair of computing services is longer than the time period associated with the maximum suggested correlation. FIG. 6 represents an example 600 of such a function.

Referring to FIG. 6, if the time difference between initializations is short (or even simultaneous), this would indicate that the initialization of A was not dependent on B. Referring to FIG. 6, there is no weight given to a dependency correlation in which computing service A is initialized within a minute of computing service B. This is based on the assumption that one minute is not sufficient time for computing service A to recognize the presence of computing service B, and thus the close initialization times is more likely the result of a coincidence than a real functional dependency. On the other hand, if the time between initializations is too long (in the example, more than 60 minutes), this would suggest that the service that was initialized later does not depend on the service that was initialized earlier. Otherwise, the later-initialized service would have tried to initialize earlier. Between these two extremes, there are time differences that suggest varying possibilities for the existence of a dependency.

In one example, suppose that there were five instances of the initialization of A being after the initialization of B. Suppose that in one of those events, out of coincidence, the initialization of A occurred simultaneous to the initialization of B. This would result in no increase in the dependency factor for that one sample. However, suppose that the other four initializations of A occurred 10 minutes after a corresponding initialization of B. This would result in a heavy weighting of these events in the dependency factor since 10 minutes suggests the maximum possibility of a dependency between the two using the function of FIG. 6.

Of course, the function illustrated in FIG. 6 is completely arbitrary. The precise form of the function may be altered over time as the characteristics of a particular system become better known. The function may also be improved upon through experimentation to see how much predictive behavior the function provides. Alternatively or in addition, the function may be selected by a user, and/or tuned using other measures. In one embodiment, the function is skewed using, for example, a gamma or lognormal distribution.

The following Table 2 illustrates an example matrix that may be constructed using act 501 of FIG. 5 for the initializations of ten different computing services abstractly referred to as A through J.

TABLE 2

|   | A     | B     | C     | D     | E     |
|---|-------|-------|-------|-------|-------|
| A | NA    |       |       |       |       |
| B | −0.30 | NA    |       |       |       |
| C | −0.31 | 0.85  | NA    |       |       |
| D | 0.93  | −0.19 | −0.16 | NA    |       |
| E | 0.87  | −0.46 | −0.28 | 0.89  | NA    |
| F | −0.24 | 0.99  | 0.86  | −0.16 | −0.41 |
| G | −0.27 | 0.94  | 0.82  | −0.13 | −0.42 |
| H | 0.93  | −0.19 | −0.15 | 0.55  | 0.89  |
| I | −0.44 | 0.83  | 0.96  | −0.28 | −0.42 |
| J | 0.89  | −0.35 | −0.21 | 0.84  | 0.93  |

|   | F     | G     | H     | I     | J  |
|---|-------|-------|-------|-------|----|
| A |       |       |       |       |    |
| B |       |       |       |       |    |
| C |       |       |       |       |    |
| D |       |       |       |       |    |
| E |       |       |       |       |    |
| F | NA    |       |       |       |    |
| G | 0.95  | NA    |       |       |    |
| H | −0.16 | −0.13 | NA    |       |    |
| I | 0.84  | 0.84  | −0.28 | NA    |    |
| J | −0.31 | −0.38 | 0.84  | −0.38 | NA |

In Table 2, negative values indicate that the computing service in the row occurs before the computing service in the column. Conversely, positive values indicate that the computing service in the column occurs before the computing service in the row.

In this case, act 502 may involve simply estimating that pairs of computing services having a correlation absolute value greater than some threshold amount (e.g., 0.7) have a dependency.

Returning back to FIG. 3, an initialization ordering is then derived for the computing services in the system based on the estimated initialization dependencies (act 303). If this is accomplished by the computing system 100, this may be accomplished by the mechanism 123, which may be hardware, software, or a combination. Referring back to FIG. 2, the initialization ordering may be constructed based on the following four initialization dependencies:

1) 221 depends on 222;
2) 231 depends on 232;
3) 211 depends on 221; and
4) 211 depends on 231.

Referring back to FIG. 3, as represented by the dashed box 304, the initialization ordering may then be used for any purpose. If the computing system 100 is to use the initialization ordering, other mechanism(s) may use the initialization ordering as represented by the ellipses 124. For instance, the computing services may be automatically initialized following the initialization ordering (act 305). In the example of FIG. 2, the DNS server and domain controller would be initialized first. The file server would be initialized after the domain controller. The database server would be initialized after the DNS server. Finally, the Web server would be initialized after the file and database servers. This process may be automated so that no or little intervention is needed from a user or IT professional.

Alternatively or in addition, the initialization of the computing systems themselves (as opposed to the computing services) may be derived (act 306) based on the derived initialization ordering for the computing services. This initialization may be accomplished through booting. For instance, referred to FIG. 2, the computing system 203 would be booted first, followed by computing system 202, followed by the computing system 201. Additionally, the booting operation may be automated to occur in the derived boot order (act 307).

There may be other uses for the derived initialization ordering (act 308). For example, such information may be useful in troubleshooting complex systems of interacting computing services, or in predicting the downstream effects of interrupting a service on which other services depend.

The method 300 may be repeated such that the initialization ordering is calculated in real-time. Furthermore, as previously mentioned, the initialization ordering may be calculated for a prior or a future instant in time. Accordingly, the principles of the present invention provide a mechanism for automatically deriving an initialization ordering for multiple computing services distributed across multiple computing systems.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A computer-implemented method for deriving an initialization order for a plurality of computing services provided by at least one computing system, the method comprising:
    identifying at least one prior initialization of each of the plurality of computing services;
    monitoring at least one initialization timestamp generated during the prior initialization of each of the plurality of computing services;
    estimating, based on the initialization timestamp, at least one initialization dependency for each of the plurality of computing services; and
    deriving, based on the estimated initialization dependency, an initialization order for the plurality of computing services provided by the at least one computing system.

2. A computer-implemented method in accordance with claim 1, further comprising:
    initializing the plurality of computing services in the initialization order.

3. A computer-implemented method in accordance with claim 1, wherein the at least one computing system comprises a plurality of computing systems, and the method further comprises deriving a proper boot order for the plurality of computing systems based on the initialization order for the plurality of computing services.

4. A computer-implemented method in accordance with claim 3, further comprising rebooting the plurality of computing systems in the proper boot order.

5. A computer-implemented method in accordance with claim 1, wherein the plurality of computing services are each software applications.

6. A computer-implemented method in accordance with claim 1, wherein the at least one prior initialization comprises a plurality of prior initializations.

7. A computer-implemented method in accordance with claim 1, wherein estimating the at least one initialization dependency comprises:
    for multiple pairs of initializations of a pair of computing services, estimating a sequential time-based correlation for at least one pair of initializations of the pair of computing services; and
    estimating that the pair of computing services having pairs of initializations with higher sequential time-based correlation have an initialization dependency.

8. A computer-implemented method in accordance with claim 7, wherein estimating the sequential time-based correlation comprises:
    weighting the correlation with a time-dependency function so that the correlation tends to be lower if a period of time between initializations of the pair of computing services is within a time period that is less than a time period associated with a maximum suggested correlation, and also tends to be lower if the period of time between the initializations of the pair of computing services is longer than the time period associated with the maximum suggested correlation.

9. A computer-implemented method in accordance with claim 1, wherein monitoring at least one initialization timestamp comprises:
    monitoring at least one initialization event log for the at least one computing system; and
    filtering the initialization event log for events related to initialization of the plurality of computing services.

10. A computer-implemented method in accordance with claim 9, wherein the at least one computing system comprises a plurality of computing systems, and monitoring the at least one initialization timestamp comprises evaluating time entries in event logs of each of the plurality of computing systems in light of time differentials between the plurality of computing systems.

11. A computer-implemented method in accordance with claim 1, wherein the initialization order is a first initialization order, the plurality of computing services is a first plurality of computing services, the at least one computing system is a first plurality of computing systems, and the at least one initialization dependency are first one or more initialization dependencies, the method further comprising:
    monitoring at least one initialization timestamp generated during the prior initialization of each of a second plurality of computing services provided by a second plurality of computing systems;
    estimating, based on the initialization timestamp of the second plurality of computing services, second one or more initialization dependencies for each of the second plurality of computing services; and
    deriving, based on the estimated second one or more initialization dependencies, a second initialization order for the second plurality of computing services of the second plurality of computing systems.

12. A computer-implemented method in accordance with claim 11, wherein the first initialization order is different from the second initialization order.

13. A computer-implemented method in accordance with claim 11, wherein the first plurality of computing services is different from the second plurality of computing services.

14. A computer-implemented method in accordance with claim 11, wherein the first plurality of computing systems is different from the second plurality of computing systems.

15. A computer-implemented method in accordance with claim 1, wherein each of the at least one prior initialization of each of the plurality of computing services is the most recent prior initialization of each computing service.

16. A computer-implemented method in accordance with claim 1, wherein each of the at least one prior initialization of each of the plurality of the computing services is not the most recent prior initialization of each computing service.

17. A computer program product comprising one or more computer-readable storage media having thereon computer-executable instructions that, when executed by one or more processors of a computing system, cause the computing system to perform a method for deriving an initialization order for a plurality of computing services provided by at least one computing system, the method comprising:
    identifying at least one prior initialization of each of the plurality of computing services;
    monitoring at least one initialization timestamp generated during the prior initialization of each of the plurality of computing services;
    estimating, based on the initialization timestamp, at least one initialization dependency for each of the plurality of computing services; and
    deriving, based on the estimated initialization dependency, an initialization order for the plurality of computing services provided by the at least one computing system.

18. A computer program product in accordance with claim 17, wherein the one or more computer-readable media are physical media.

19. A computing system comprising:
    one or more processors;
    one or more computer-readable storage media having thereon computer-executable instructions that, when executed by one or more processors of a computing system, cause the computing system to perform a method for deriving an initialization order for a plurality of computing services provided by at least one computing system, the method comprising:
    identifying at least one prior initialization of each of the plurality of computing services;
    monitoring at least one initialization timestamp generated during the prior initialization of each of the plurality of computing services;
    estimating, based on the initialization timestamp, at least one initialization dependency for each of the plurality of computing services; and
    deriving, based on the estimated initialization dependency, an initialization order for the plurality of computing services provided by the at least one computing system.

20. A computing system comprising:
    a mechanism for identifying at least one prior initialization of each of a plurality of computing services;
    a mechanism for monitoring at least one initialization timestamp generated during the prior initialization of each of the plurality of computing services;
    a mechanism for estimating, based on the initialization timestamp, at least one initialization dependency for each of the plurality of computing services; and
    a mechanism for deriving, based on the estimated initialization dependency, an initialization order for the plurality of computing services.

* * * * *